United States Patent

[11] 3,563,372

| [72] | Inventors | William H. Baum<br>Westchester;<br>John Mostetich, Elmhurst, Ill. |
|---|---|---|
| [21] | Appl. No. | 818,856 |
| [22] | Filed | Apr. 21, 1969<br>Continuation of application Ser. No. 650,135, June 29, 1967, now abandoned, which is a continuation of application Ser. No. 187,372, Apr. 13, 1962, now abandoned. |
| [73] | Assignee | Fastener Corporation<br>Franklin Park, Ill. |

[54] METHOD AND APPARATUS FOR COATING FASTENING DEVICES, AND IMPROVED COATING AND FASTENING DEVICES
1 Claim, 8 Drawing Figs.

[52] U.S. Cl. .................................................. 206/56;
117/128.4, 117/128.7
[51] Int. Cl. .................................................. B65d 71/00;
B44d 1/42
[50] Field of Search ........................................ 206/56HD;
117/128.4, 128.7; SN/650137, 187372

[56] References Cited
UNITED STATES PATENTS

| 2,403,783 | 7/1946 | Boak ............................. | 117/132 |
| 2,423,171 | 7/1947 | Boak ............................. | 117/132 |
| 2,724,303 | 11/1955 | Holcomb ....................... | 117/128.4 |
| 3,076,373 | 2/1963 | Mathews ....................... | 117/128.7 |
| 3,252,569 | 5/1966 | Mathews ....................... | 117/128.7 |

OTHER REFERENCES
Surface Coating and Finishes, Gordon et al., Chemical Publishing Co., Inc., New York, 1954 pp. 41—44, 68, 84, 161, 162, 186, 196

*Primary Examiner*—Morris Liebman
*Assistant Examiner*—Samuel L. Fox
*Attorney*—Mason, Kolehmainen, Rathburn and Wyss

ABSTRACT: Fastening devices having shank portions with means for securing said devices in a strip with the shank portions in generally parallel relationship, portions of the shank portions of said fasteners being coated with a synthetic resin to improve the holding properties. The coating on the one side of the shank portions being the combination of a rubber resin and a polyester resin in a volatile organic liquid and the coating on another side of the shank portions being the combination of a phenolic resin and a vinyl acetal resin in a volatile organic liquid.

INVENTORS
WILLIAM H. BAUM AND
JOHN MOSETICH
BY Mason, Kolehmainen, Rathburn and Wyss.
ATTORNEYS.

Patented Feb. 16, 1971

INVENTORS
WILLIAM H. BAUM AND
JOHN MOSETICH
BY Mason, Kolehmainen, Rathburn and Wyss
ATTORNEYS.

Patented Feb. 16, 1971
3,563,372
3 Sheets-Sheet 3
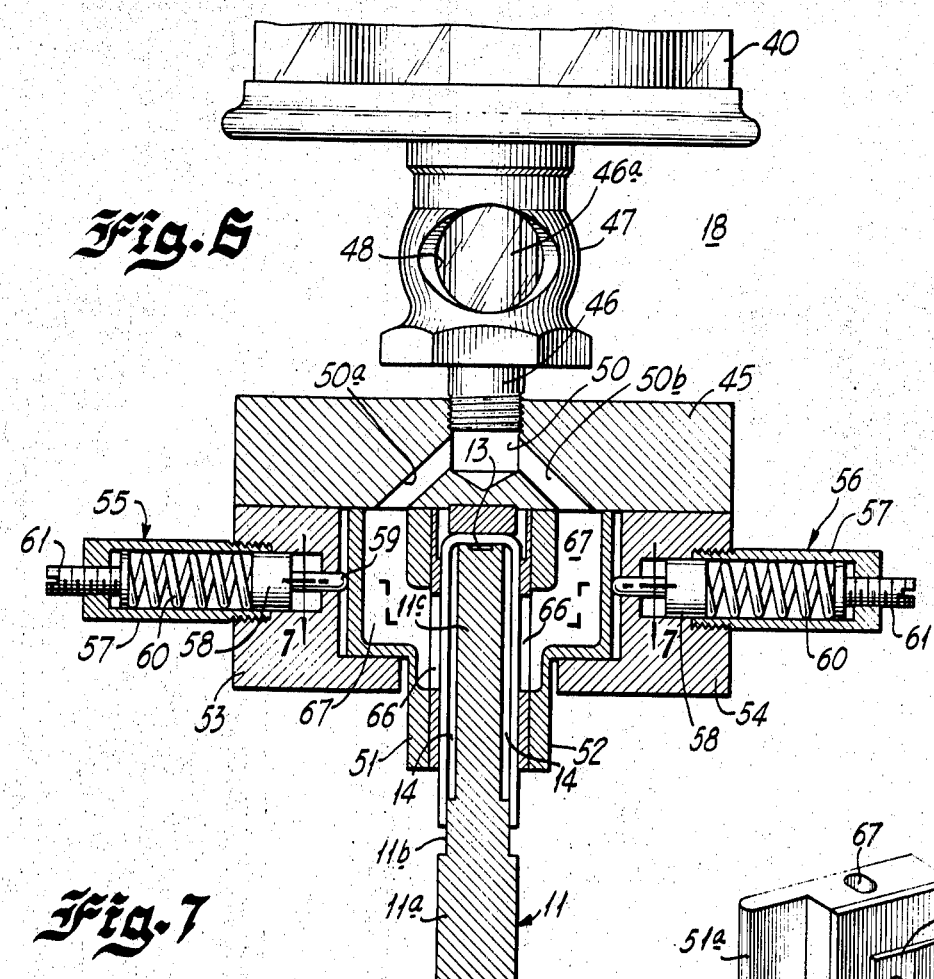
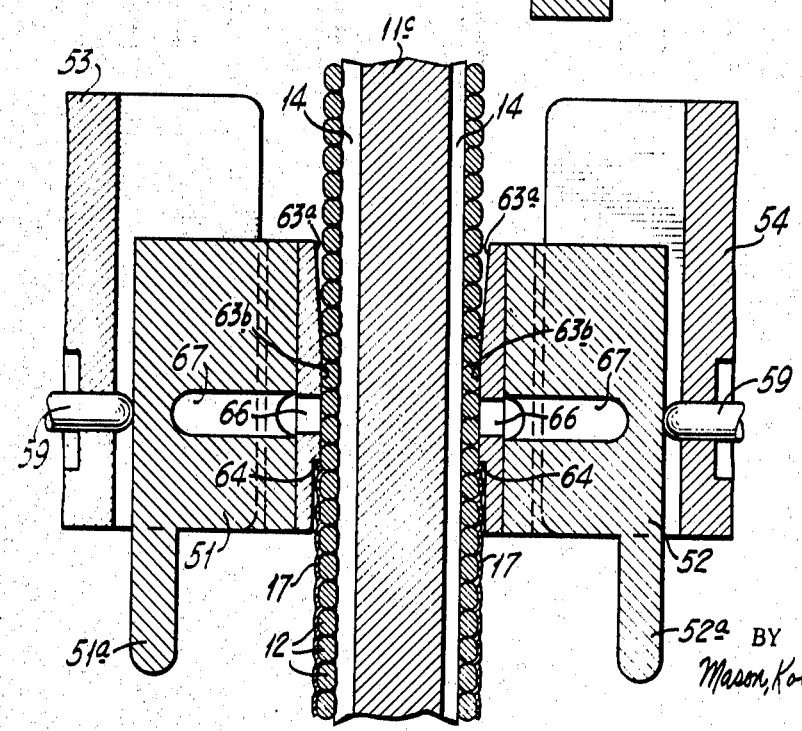
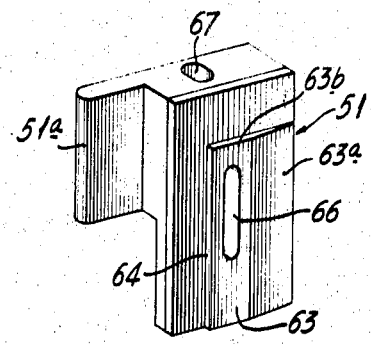
INVENTORS
WILLIAM H. BAUM AND
JOHN MOSETICH
BY Mason, Kolehmainen, Rathburn and Wyss
ATTORNEYS.

METHOD AND APPARATUS FOR COATING FASTENING DEVICES, AND IMPROVED COATING AND FASTENING DEVICES

The present application is a continuation of Baum and Mosetich application Ser. No. 650,135, filed June 29, 1967, which was in turn a continuation of Baum and Mosetich application Ser. No. 187,372, filed April 13, 1962, both now abandoned assigned to the same assignee as the present application.

The present invention relates to coated fastening devices together with a method and apparatus for coating the same and an improved coating for use in manufacturing coated fastening devices.

Fastening devices, such as nails or staples adapted to be driven by automatic fastener-driving equipment, are commonly manufactured in strips or sticks of a predetermined length comprising a certain number of fasteners which are adhesively secured together. This is true whether the fasteners are nails or staples. An important criterion of satisfactory fastening devices is the holding power thereof when driven into various materials, the most common of these materials being wood. To improve the holding power, various coatings have been applied to fastener devices. However, many of these coatings have been difficult to apply, have deteriorated with age, and, most important, are difficult to apply with automatic machinery and during the manufacturing operation when staples or nails are manufactured. It would be desirable to provide an improved coating resulting in an improved fastener together with improved means for applying the coating.

Accordingly, it is an object of the present invention to provide a new and improved coated fastener.

It is another object of the present invention to provide an improved method and apparatus for applying a coating to a fastener while manufacturing the same, which fastener is to be used with automatic fastener driving apparatus.

Still another object of the present invention resides in the provision of an improved coating, which, when applied to fastening devices, will greatly increase the holding power thereof.

Further objects and advantages of the present invention will become apparent as the following description proceeds and the features of novelty which characterize the invention will be pointed out with particularity in the claims annexed to and forming a part of this specification.

For a better understanding of the present invention, reference may be had to the accompanying drawings in which:

FIG. 4 shows the complete structure;

FIG. 6 is an enlarged sectional view taken on line 6-6 of FIG. 1 assuming that FIG. 1 shows the complete structure;

FIG. 7 is an enlarged sectional view taken on line 7-7 of FIG. 6, assuming that FIG. 6 shows the complete structure; and FIG. 8 is a perspective view of one element embodied in the structure of FIGS. 1, 6 and 7.

Briefly, the present invention is concerned with applying a coating of a synthetic resin to fastening means which have been assembled in strip form and adhesively secured together. The synthetic resin is applied to both the inside and the outside of these strips during the manufacturing process thereof. In the case of staples, the legs of each are coated on both sides and in the case of nails both sides of the strip or stick of nails are coated. This resin coating is applied in liquid form of rather syrupy consistency and in a solvent which dries very rapidly so that the fastening means can be immediately packed into boxes in the conventional manner. The invention is also concerned with an improved resin formulation which, when properly applied to the fastening devices, provides great holding power when they are driven into various materials. Additionally, it is concerned with an improved apparatus for applying the resin coating. The application of this coating does not in any way interfere with the normal manufacturing process.

Figures 1, 2:
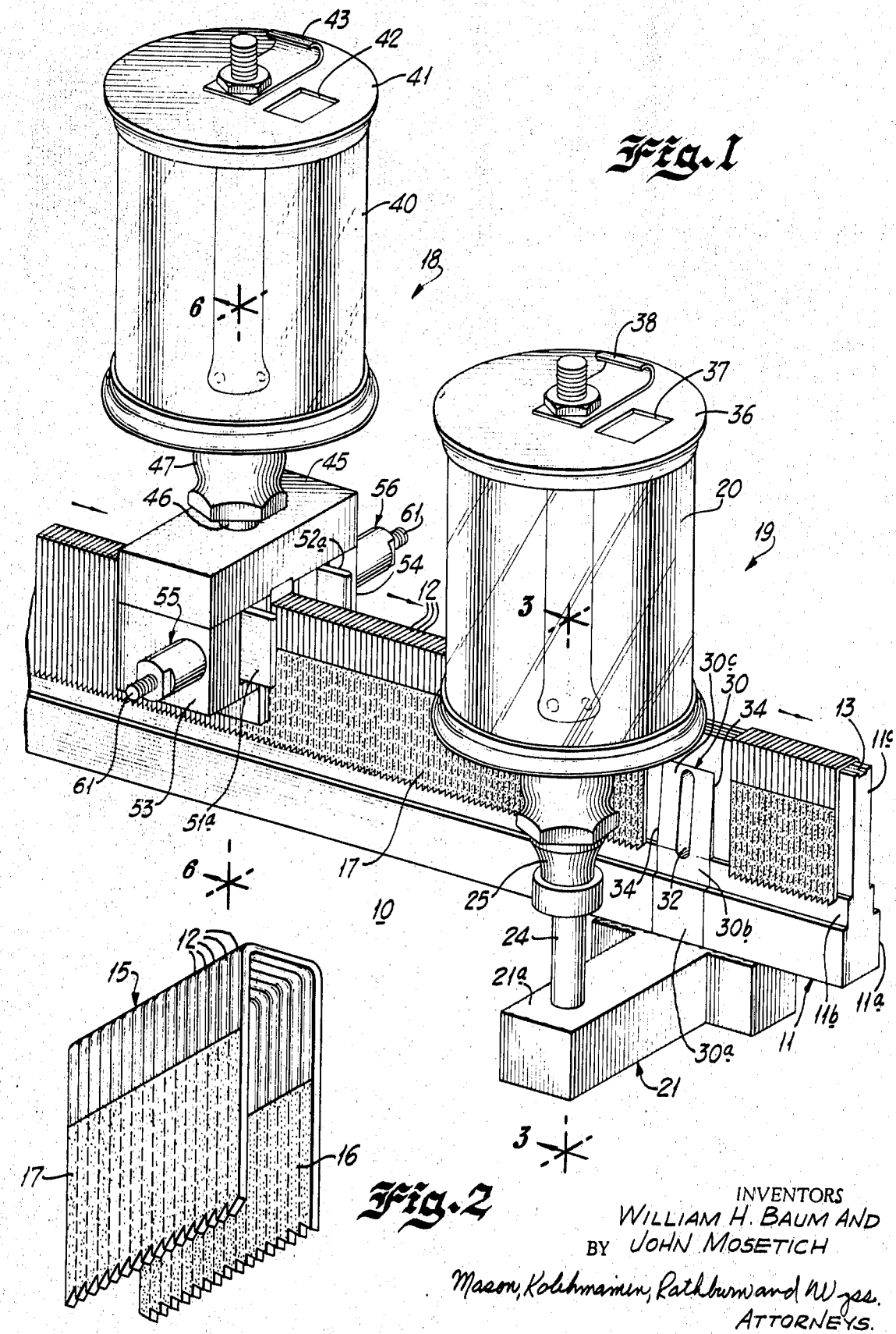
FIG. 1 is a perspective view of apparatus for applying a coating both to the inside and outside legs of staples during the manufacture thereof with certain staples adjacent the inside coating means being removed more clearly to illustrate the present invention.
FIG. 2 is a perspective view of coated staples manufactured in accordance with the present invention.
Figure 3:
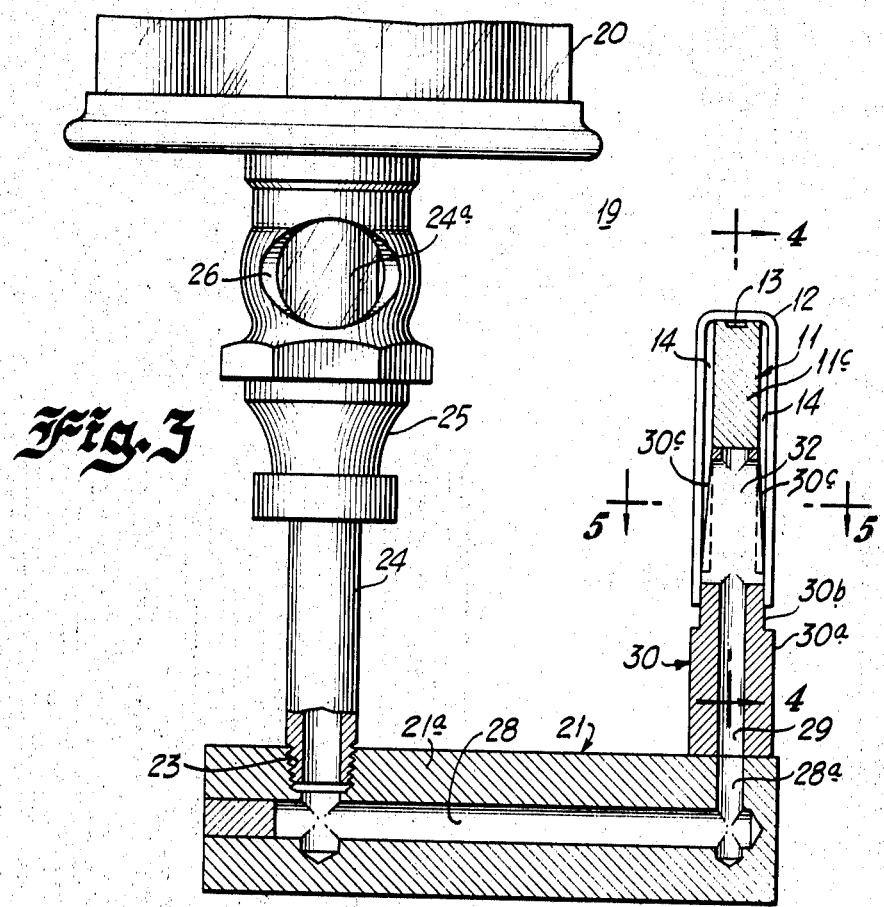
FIG. 3 is an enlarged sectional view taken on line 3-3 of FIG. 1, assuming that FIG. 1 shows the complete structure.

Referring now to the drawings, there is illustrated apparatus generally designated at 10 for applying a synthetic resin coating to staples after they have been adhesively secured together. Although the apparatus is illustrated specifically for applying the coating to staples, it will be understood that almost identical apparatus would be employed to apply the coating to nails, it being possible to eliminate the inside applicator when nails are employed. The present invention is obviously equally applicable to coating nails or staples. In the manufacture of staples, wire is fed to the staple-making machinery and this wire is converted into U-shaped staples which, as each is completed, is moved along a supporting rail, generally indicated at 11. The staples themselves are designated by the reference numeral 12. To reduce the friction occasioned by virtue of the staples 12 moving along the rail 11, the latter is provided with a longitudinally extending recess 13 along the top of the rail. Furthermore, the rail 11 is provided with a wider bottom portion 11a and an intermediate portion 11b narrower than the portion 11a but wider than the main portion of the rail designated as 11c, as best shown in FIGS. 1 and 6 of the drawings. The tips or lower ends only of the legs of staples 12 engage the portion 11b, whereby the rail 11 guides the crown of the staple and the tips of the legs. A substantial space 14 is provided on either side of rail 11 between portion 11c thereof and the legs of staples 12, as clearly shown in FIGS. 6 and 7, and the rail 11 thus does not interfere with applying a coating to the inside of the staple legs in the spaces 14 and, of course, the friction is also reduced.

Figure 4:
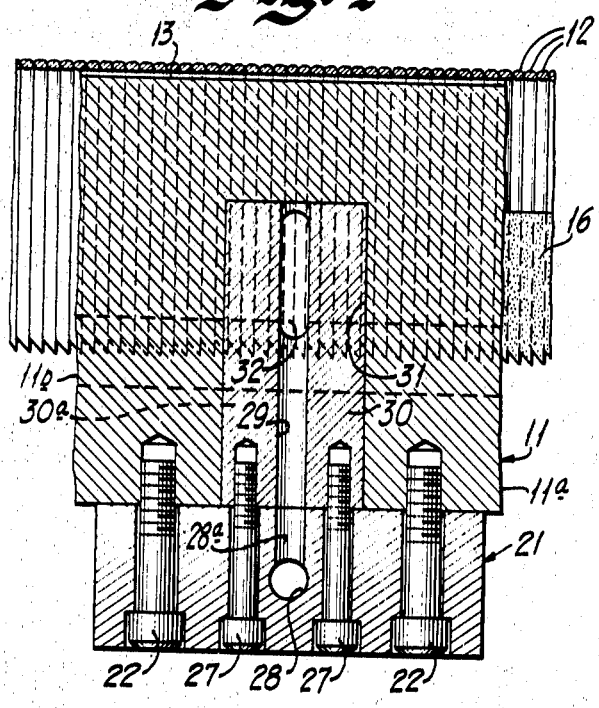
FIG. 4 is an enlarged fragmentary sectional view taken on line 4-4 of FIG. 3, again assuming that FIG. 3 shows the complete structure.
Figure 5:
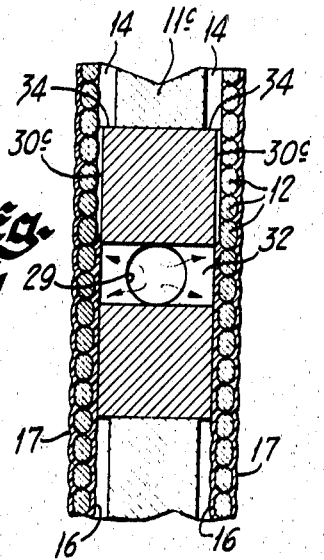
FIG. 5 is a sectional view taken on line 5-5 of FIG. 4, assuming

It should be understood that the fastening devices 12 are moved along the rail 11 by the apparatus which forms them and pushes them along the rail so that a chain of fastening devices, such as staples, are moved along. Moreover, an adhesive is applied to the entire outside of the staples as they move along the rail 11, whereby the strips of staples mounted on the rail are adhesively secured together. It will be understood that if the fastening devices were nails instead of staples that the rail 11 would be in the form of a track with the heads of the nails sliding along the top of the track and the lower portions of the nails depending from the track in a manner similar to the way the legs of the staples 12 depend along the rail. It will also be understood that the left-hand end of the rail 11, as viewed in FIG. 1 of the drawings, is adjacent the mechanism, not shown, for forming the staples and adhesively coating the outside thereof and these staples then move along the rail in the direction of the arrow shown in FIG. 1. At the right-hand end of the rail 11, the adhesively secured and coated fastening devices are broken into strips or sticks of the desired length for packaging. In FIG. 2 of the drawings, staples 12 are indicated as being adhesively secured together in what is commonly termed a strip or stick of staples and the reference numeral 15 designates the entire stick of staples 12 adhesively secured together. This stick 15 is indicated as having an inside resin coating 16 and an outside resin coating 17 applied in accordance with the present invention and having the formulation of the present invention. The outside coating 17 is also shown in FIGS. 1, 5 and 7 while the inside coating 16 is also shown in FIGS. 2, 4 and 5 of the drawings. These resin coatings may be of somewhat different material, if desired, and may have different colors, which colors may be used to code the staples by size or use. Actually, the staples in stick form, such as 15 in FIG. 2 of the drawings, leave the right-hand end of rail 11 and move along endless belts, not shown, to packaging stations where the sticks or strips are packaged for shipment to users.

In accordance with the present invention, the adhesively secured fastening devices, such as the staples 12 moving along the rail 11 (in the case of nails, the adhesively secured nails, moving along a suitable track), first pass through an outside coating station, generally designated as 18 for applying a resin coating to the outside of the legs of the adhesively secured staples 12 and then subsequently passes through an inside coating station 19 for supplying a resin coating to the inside of the legs of the staples 12. Obviously, the outside coating 17 may be applied after the inside coating 16, if desired, but it has been found advantageous to apply the outside coating first so that it has slightly more time to dry before the coating 17 engages the endless belts for moving the strips or sticks 15 to the packaging station after they leave rail 11. It is obviously desirable to have the outside resin coating 17 sufficiently dry so that its engagement with the belt will not adversely affect either the belt or the coating.

Considering first the apparatus involved at coating station 19 for coating the inside of the legs of the staples 12 adhesively secured together, reference should be had to FIGS. 1, 3, 4 and 5 of the drawings. The resin coating in syrupy liquid form, preferably in a ketone or ester solvent, is disposed in a container 20 raised above rail 11 so that the coating fluid may be fed by gravity. Preferably container 20 is provided with transparent walls so that the amount of coating contained therein can readily be determined and the operator will know when to replenish the supply. The container 20 is mounted on a mounting block 21 secured as by fastening means 22 (FIG. 4) to portion 11a of the rail 11. The mounting block 21 includes a lateral projection 21a having a threaded opening 23 for receiving a tubular conduit 24 connected to the bottom of container 20 by suitable coupling means 25, including a sight opening 26. A portion of tubular conduit 24, designated as 24a, is preferably formed of transparent material so that one may view the flow of the liquid coating through tubular conduit 24. The supporting block 21 is provided with a passageway 28 defined therein having one end connected to the tubular conduit 24. The other end of passageway 28 is connected by a passageway 28a with a passageway 29 defined in an inside coating applicator 30.

In accordance with the present invention, the rail 11 is notched or recessed as indicated at 31 and disposed in this recess is the inside coating applicator 30 which is secured by fastening means 27 to the supporting block 21. Preferably applicator 30 has a lower portion 30a which conforms to the shape of portion 11a of rail 11 and provides steps on either side thereof similar to the steps defined between portions 11a and 11b of rail 11. A portion of applicator 30 immediately above these steps, designated by the reference numeral 30b, has the same thickness or preferably a slightly greater thickness than the portion 11b of rail 11. The remainder of applicator 30 starting slightly above the tips of the legs of staples 12 is provided with tapered walls or applicator faces 30c on either side thereof of such dimensions that the upper end of the applicator has the same thickness as portion 11c of rail 11. The passageway 29 defined in inside applicator 30 terminates on either tapered face 30c thereof in an elongated slot 32, whereby liquid resin coating may be supplied by gravity from the container 20 to the tapered applicator faces 30c. Since the tips of the legs of the staples 12 are engaged by the portion 30b of applicator 30 which is so dimensioned as to snugly engage the staple legs and, if anything, slightly spread them apart, the liquid coating is prevented from flowing beyond the tips of the legs of staples 12. It will be appreciated that the length of the elongated slots 32 determines the amount of the staple which is coated, and the width of the slot together with the viscosity of the coating determines to some extent the thickness of the coating 16. The thickness is also determined by the step 34 provided on the trailing edge of the applicator 30 with reference to the rail 11.

In an embodiment built in accordance with the present invention, the applicator 30 was formed of metal and a uniform coating was applied, the thickness of which was determined by the step 34 (FIGS. 1 and 5) and the width of the slot 32, and, of course, to some extent the viscosity of the coating material. Preferably, the coating material has a syrupy consistency, as mentioned above, with a viscosity of between 4,000 and 5,000 centipoises. It will be appreciated that depending upon the wire from which the fasteners 12 are made the thickness of the coating applied may vary. If the staples are of circular cross section, a thinner coating is necessary since the coating will be sufficiently thick in the fairly large spaces which are present adjacent the touching portions of the cylindrical legs. On the other hand, if a wire of almost rectangular cross section is employed, a thicker coating is desirable. As a matter of fact, the step 34 may be omitted where round wire is employed but is essential where a relatively thick coating on a flat wire is desired.

As illustrated in the drawings, the container 20 is provided with cover 36 having a filling opening 37 therein. If desired, a suitable cover 38 for this filling opening may be provided, to prevent evaporation. However, during the operation of the apparatus, the opening 37 is not closed so that satisfactory gravity feed of the material will result.

The station 18 for coating the outside legs of the staples 12 is in many respects very similar to station 19 and comprises a coating container 40 which may be identical with the container 20. Likewise, the cover 41 having a filling opening 42 and a suitable closure member 43 for the opening 42 may be identical with corresponding elements associated with container 20. As illustrated in the drawings, container 40 is suitably supported on a block 45 by means of a tubular conduit 46 and coupling member 47 which has a sight hole 48 for permitting viewing of the transparent conduit portion 46a in exactly the same manner as in connection with the arrangement described at coating station 19. Preferably supporting block 45 and container 40 are mounted effectively to float upon the crowns of the staples 12 supported on rail 11. Obviously to insure that these elements 40 and 45 do not tip relative to the staples 12 mounted on the rail 11, suitable supporting means, not shown, are provided, but these supporting means permit the floating action so that gravity essentially causes the container 40 and the block 45 to be supported on the staple crowns, which, in turn, are supported on the rail 11.

As best shown in FIG. 6 of the drawings, the block 45 is provided with a passageway 50 so that the coating may pass from container 40 through conduit 46 into passageway 50. The passageway 50 is divided into a forked passageway, the branches of which are designated as 50a and 50b, whereby the coating may be directed toward either side of the rail 11. Disposed beneath the outlet end of the passageways 50a and 50b are a pair of applicators 51 and 52, the applicator 52 being best shown in FIG. 8 of the drawings. The applicators 51 and 52 are substantially identical except for the fact that one is a right-hand and the other is a left-hand applicator.

In order that these applicators 51 and 52 may be biased against the outside of the legs of staples 12, suitable support members 53 and 54 are secured to the block 45 by any suitable means. Mounted in support members 53 and 54 are applicator-biasing means 55 and 56, respectively, for applying an adjustable bias to move the applicators 51 and 52 into engagement with the outside surface of the legs of the staples 12 as they pass along the rail 11. The biasing means 55 and 56 are identical and each comprises a cylinder 57 threadedly mounted in the associated support member 53 and 54. A piston 58 is reciprocally mounted within the cylinder 57 and includes a pin 59 for engaging the associated applicator. A compression spring 60 mounted within the associated cylinder provides the biasing energy. Adjustable means 61 threadedly mounted in the end of cylinder 57 permit an adjustment of each biasing means 55 and 56, as desired.

Whereas the interior applicator 30 was designed to have a thickness where it engaged the tips of the legs of staples 12 at least as great as the space between the legs of the staples to insure engagement with the inside of the legs, the exterior applicators 51 and 52 are biased by the biasing means 55 and 56 to insure engagement with the outside of the legs of staples 12.

Since applicators 51 and 52 are substantially identical, it is sufficient to describe in detail only one of these applicators and applicator 51 has been chosen in this connection. Applicator 51 is provided on the side thereof engaging the staple legs with an applicator surface 63 which includes a tapered portion 63a and a raised flat surface 63b which terminates on the side opposite the tapered portion 63a in a step or shoulder 64. The tapered portion 63a defines a sort of throat for permitting the oncoming staples 12 to enter between the applicators 51 and 52 and the step 64 defines the means for controlling the thickness of the coating, designated as 17 in the drawings. The throatlike construction provided by the tapered surfaces and the steps is best shown in FIG. 7 of the drawings. It will be appreciated that the height or thickness of the step 64 will determine the thickness of the coating 16, as is readily apparent from FIG. 7 of the drawings. As in connection with the inside applicator 30, the applicators 51 and 52 are each provided with an elongated slot 66 in the surface portion 63b defining the surface riding along the outside legs of the staples 12. This elongated slot 66 is connected by an L-shaped passageway 67 which is identical in each of the applicators 51 and 52 connecting the particular applicator with the associated passageway 50a or 50b, as the case may be. Each of the applicators 51 and 52 is provided with a projection 51a and 52a, respectively, which may be grasped to manually move the applicator when desired. Thus, as in the case of the inside applicator 19, the coating in liquid form flows from the container 40 to the applicators 51 and 52 and the desired coating is applied to the outside of the legs of staples 12. As was mentioned above, the coating dries very rapidly and by the time the staples reach the end of the rail 11 where the adhered staples are broken into strips 15 of a predetermined length for packaging, the exterior coating is sufficiently dry so that the adhered strips may move along the belt to the packaging center.

The coatings 16 and 17 applied to the fastening means, which, as mentioned above, could comprise either nails or staples, are preferably a synthetic rubber resin in an organic solvent, having the consistency of a medium syrup. In one particular application of the present invention, the liquid coating used on the outside was gray in color, had a solids content of the order of 36 percent comprising a thermoplastic polyester resin and a density of 8.2 lbs. per gallon. The solvent was methyl ethyl ketone although other ketones or a suitable ester could also be employed. The range of molecular weight of the resin was from 80,000 to 90,000. The coating formulation had a viscosity of 4,825 centipoises and a flash point of 24° F.

The outside coating is generally a suspension of a synthetic rubber resin or a polyester resin in a volatile organic solvent, such as a ketone, ester or alcohol, having a boiling range not higher than about 300° F. The synthetic rubber resin can be chlorinated rubber, styrene-butadiene resin, butadiene-acrylonitride resin, vinylidene chloride-acrylonitride resin or any other synthetic rubber resin. The polyester resins are made from glycols such as ethylene glycol, diethylene glycol, triethylene glycol, propylene glycol, decamethylene glycol or hexamethylene glycol and from dibasic acids such as phthalic acid (or anhydride), terephthalic acid, succinic acid, adipic acid, sebacic acid, azelaic acid and unsaturated dibasic acids such as fumaric acid, dimerized soybean fatty acids, dimerized linoleic acid and maleic acid (or anhydride), using equal mole ratios of glycol and total dibasic acids. The rubber resin or polyester resin usually comprises 25—50 percent of the coating formulation and the remainder of the formulation is made up of organic solvents of the type described above.

The inside coating is generally a suspension of a phenolic resin and a vinyl acetal resin in an organic solvent, such as a mixture of aromatic hydrocarbon liquids and alcohols having boiling ranges not higher than about 300° F. The solvents for such formulations include benzene, toluene, xylene, methanol, ethanol, pentanol, and related compounds. The phenolic resin usually comprises 1 to 7 percent of the formulation and preferably is an alcohol-soluble baking resin of the phenol-aldehyde type, although resin-modified phenolic resins are also suitable. Phenolic rosins of the type embodied in the coating formulations described herein are produced from phenols such as phenol, $m$-cresol, 3,5-xylenol and bis-phenol A with 0.75 to 2 moles of formaldehyde per mole of phenol. The vinyl acetal resin comprises about 10 to 35 percent of the coating formulation and includes vinyl formal, vinyl acetal, and vinyl butyral resins. This type of resin is produced from polyvinyl alcohol (or hydrolysis products of polyvinyl esters) and an aldehyde such as formaldehyde, acetaldehyde or butyraldehyde, the hydroxyl groups of the polyvinyl alcohol reacting with the aldehyde molecules to form acetal groups on the vinyl chain. Such vinyl acetal resins can be cured by heat in combination with phenolic resins to form thermoset resins which are resistant to organic solvents and moisture and adhere to metal surfaces, forming hard coatings thereon.

For an inside coating employed in accordance with the present invention where a blue color was used, the formulation was as follows:

| | |
|---|---|
| Aromatic Hydrocarbon solvent | 29.0 % |
| Alcohol (denatured) | 46.0 |
| PHenol-Formaldehyde Resin | 2.4 |
| Polyvinyl Butyral Resin | 20.0 |
| Expanded Silica Filler | 1.6 |
| Color | 1.0. |

Although it is possible to apply the coating to the fastening devices for the entire length thereof to be driven into a particular material, it has been found that if the lower one-half to three-quarters of an inch of the fastener is coated that sufficient holding power is produced. The coated staples of the present invention, coated with a synthetic rubber resin, have been found to have unusual holding power far superior to that of prior art devices.

In view of the detailed description included above, it will readily be appreciated that there has been provided improved apparatus for applying a resin coating to fastening devices, such as nails and staples, which coating produces greatly improved holding power and the invention is concerned with the apparatus for applying the coating, the coating itself and the fastening means with the coating applied thereto.

While particular embodiments of the present invention, including a particular formulation of a coating, have been described, it will be understood that various changes and modifications will occur to those skilled in the art and it is intended in the appended claims to cover all those changes and modifications which fall within the true spirit and scope of the present invention.

We claim:

1. A unitary strip of fastening means comprising:
    a plurality of staples each having a pair of shank portions;
    means for joining said fasteners together in said strip with said shank portions disposed in a generally parallel relationship, said individual fasteners being readily separable from said strip;
    at least portions of the inside surfaces of said shank portions being covered with a first synthetic resin coating and at least portions of the outside surfaces of said shank portions being covered with a second synthetic resin coating to improve the holding properties thereof;
    said second coating comprising a synthetic resin in a volatile organic liquid, the synthetic resin being selected from the group consisting of:
    a. a synthetic rubber selected from the group consisting of chlorinated rubber and styrene-butadiene, butadiene-acrylonitrile and vinylidene chloride-acrylonitrile resins; and
    b. a polyester resin derived from esters of alkylene glycols containing 2 to 10 carbon atoms with dibasic acids containing 4 to 36 carbon atoms; and said first coating comprising a combination of a phenol-aldehyde resin and a vinyl acetal resin in a volatile organic liquid, the vinyl acetal resin being derived from polyvinyl alcohol or esters and formaldehyde, acetaldehyde or butyraldehyde and comprising about 10 to 35 percent of the coating.